April 13, 1943. D. G. C. HARE 2,316,329
SUBSURFACE PROSPECTING
Filed June 18, 1940
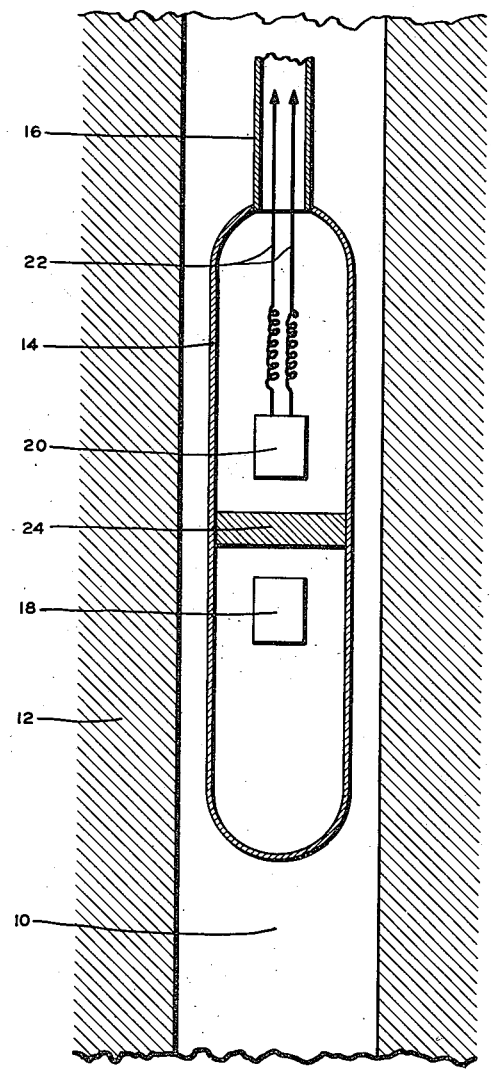
D.G.C. HARE
INVENTOR
BY R.J. Dearborn
Daniel Stryker
HIS ATTORNEYS Patented Apr. 13, 1943

2,316,329

UNITED STATES PATENT OFFICE 2,316,329

SUBSURFACE PROSPECTING

Donald G. C. Hare, Houston, Tex., assignor to Texaco Development Corporation, New York, N. Y., a corporation of Delaware Application June 18, 1940, Serial No. 341,102

4 Claims. (Cl. 250—83.6)

This invention relates to subsurface prospecting and particularly to a method and apparatus in which a radio-active substance is lowered within a bore hole, the highly penetrating particles from this source passing into the formations around the hole and certain of these particles being scattered and returned to a detector disposed near the source. The principal object of the invention is to provide such a method which will indicate positively and accurately the presence of hydrocarbon oil sands or formations when the device is passed through these formations, and particularly a method and apparatus by means of which the speed of the penetrating particles emitted from the source is effectively increased.

In a co-pending application of Donald G. C. Hare, Serial No. 337,862, filed May 29, 1940, methods and apparatus are disclosed for logging the formations surrounding a bore hole by passing a source of penetrating particles such as neutrons through the bore hole so that these particles will penetrate the formations around the hole, and then detecting those of the particles which are scattered in the formations, slowed down and returned to the surveying instrument. It is desirable that when neutrons are used as the penetrating particles, that these neutrons have as great a speed as possible and that this speed be greater than that which would be obtained from the bombardment of a light element by such particles as may be emitted from natural radioactive sources. Through the use of faster neutrons better penetration into the formations will be obtained and thus more complete knowledge concerning the nature of these formations.

In accordance with this invention, a source of neutrons, such as a mixture of radium and beryllium or polonium and lithium, is also mixed with a substance such as thorium, uranium, or protoactinium. It is known to those versed in the art that when one of these substances, i. e., uranium, thorium or protoactinium is bombarded by neutrons having the proper energy, that nuclear fissures may take place, the parent atom being split into two or more atoms of lower atomic number and that during such a fissure or transformation a certain number of neutrons of very high energy and speed are emitted. It is also probable that with a mixture of this type a greater number of neutrons will be available than when the source alone is used.

For a better understanding of the invention reference may be had to the accompanying drawing showing a sectional elevation through a part of the formation surrounding a bore hole and showing in section an instrument embodying the invention.

Referring to the drawing, a bore hole 10 is shown as having been drilled through a formation 12. An instrument having a suitable casing 14 is adapted to be lowered and raised through the well by means of a string of tubing 16 or a suitable wire line or cable. Within the casing 14 is mounted a source 18 of neutrons and this source is preferably formed of a mixture such as radium and beryllium to which another substance such as thorium, uranium, or protoactinium has been added. Also disposed within the casing 14 is a detector 20 such as a Geiger-Muller counter suitable for detecting neutrons or a boron trifluoride ionization chamber. This detector is connected by means of wires 22 to a suitable indicating or recording instrument at the surface. A lead shield 24 is disposed within the case so as to separate the source 18 from the detector 20 to prevent unwanted direct gamma radiation from the source to the detector.

In operation, the device is passed through the bore hole 10 and the fast neutrons emitted from the source 18 enter the formation 12 surrounding the hole. Because of the addition of the thorium or protoactinium to the original source, these neutrons will possess considerably higher energy and speed than those ordinarily obtained from a source such as radium-beryllium alone.

It is known that the presence of hydrogen in a formation will cause increased scattering and slowing down of the neutrons penetrating that formation and therefore as the instrument is passed through the hole 10 a greater or lesser number of neutrons will return to the detector 20, depending upon the hydrogen content of the formation. Thus, by observing the response of the detector, information may be obtained of the presence or absence of formations containing hydrogen such as water or oil sands. Fast neutrons passing directly from the source 18 to the detector 20 through the shield 24 will not materially disturb the measurement of the slow neutrons scattered in and returned from the surrounding formations.

Obviously many other modifications and variations of the invention as hereinbefore set forth may be made without departing from the spirit and scope thereof, and therefore only such limitations should be imposed as are indicated by the appended claims.

I claim:

1. In the process of investigating the formations surrounding a bore hole in which a source of neutrons is passed through the hole, the neutrons penetrating the formations and certain of these neutrons being scattered in the formations, slowed down and returned to a detector disposed near the source, the method of increasing the number, energy and speed of the neutrons entering the formations which comprises mixing with the material comprising the source of neutrons a substance in which nuclear fission can be produced with attendant liberation of neutrons so that due to the bombardment of said substance by the neutrons from said source nuclear fissions will take place whereby the neutrons leaving the mixture will be greater in number and will have a higher energy and speed than would be the case if the neutron source alone were used.

2. In the process of investigating the formations surrounding a bore hole in which a source of neutrons is passed through the hole, the neutrons penetrating the formations and certain of these neutrons being scattered and slowed down in the formations and returned to a detector disposed near the source, the method of increasing the number, energy and speed of the neutrons entering the formations which comprises utilizing as a source of neutrons a mixture of radium-beryllium and thorium so that due to the bombardment of the thorium by the neutrons from the radium-beryllium, nuclear fissions will take place whereby the neutrons leaving the mixtures will be greater in number and will have a higher energy and speed than would be the case if a source comprising radium-beryllium alone were used.

3. In the process of investigating the formations surrounding a bore hole in which a source of neutrons is passed through the hole, the neutrons penetrating the formations and certain of these neutrons being scattered and slowed down in the formations and returned to a detector disposed near the source, the method of increasing the number, energy and speed of the neutrons entering the formations which comprises utilizing as a source of neutrons a mixture of radium, beryllium and uranium so that due to the bombardment of the uranium by the neutrons from the radium and beryllium, nuclear fissions will take place in the uranium whereby the neutrons leaving the mixture will have a higher energy and speed and will be greater in number than would be the case if a source comprising radium and beryllium alone were used.

4. In the process of investigating the formations surrounding a bore hole in which a source of neutrons is passed through the hole, the neutrons penetrating the formations and certain of these neutrons being scattered and slowed down in the formations and returned to a detector disposed near the source, the method of increasing the number, energy and speed of the neutrons entering the formations which comprises utilizing as a source of neutrons a mixture of radium, beryllium and protoactinium so that due to the bombardment of the protoactinium by the neutrons from the radium and beryllium, nuclear fissions will take place in the protoactinium whereby the neutrons leaving the mixture will have a higher energy and speed and will be greater in number than would be the case if a source comprising radium and beryllium alone were used.

DONALD G. C. HARE.